G. H. Johnson.
Vault Cover.
N° 57,515. Patented Aug. 28, 1866.
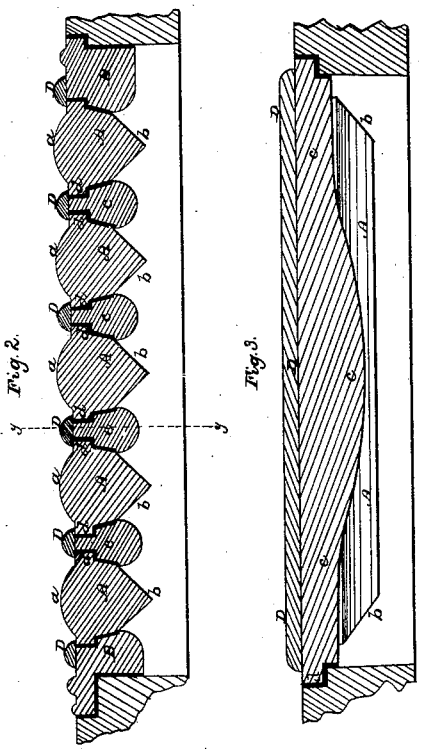
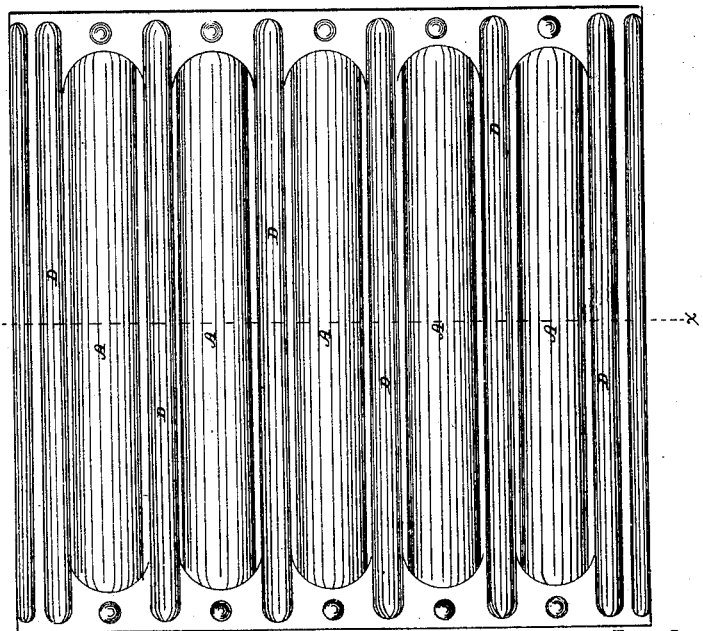
Witnesses:
Inventor
George H. Johnson
By David A. Burr
Atty.
THE GRAPHIC CO.PHOTO-LITH.39 & 41 PARK PLACE,N.Y.

UNITED STATES PATENT OFFICE.

GEORGE H. JOHNSON, OF BALTIMORE, MARYLAND.

IMPROVEMENT IN VAULT-LIGHTS.

Specification forming part of Letters Patent No. 57,515, dated August 28, 1866.

*To all whom it may concern:*

Be it known that I, GEORGE H. JOHNSON, of Baltimore, in the county of Baltimore and State of Maryland, have invented a new and Improved Corrugated Vault-Illuminator and Platform-Light; and I do hereby declare the following to be a full, clear, and exact description thereof, reference being had to the accompanying drawings, forming a part of this specification, in which—

Figure 1 is a plan or top view of one form of my improved illuminator; Fig. 2, a vertical section through the same in the line $xx$ of Fig. 1; and Fig. 3, a longitudinal section in the line $yy$ of Fig. 2.

Similar letters indicate like parts in all the figures.

The nature of my invention consists of the combination of inverted metallic girders with elongated glasses in the construction of illuminated vault-covers, whereby I am enabled to obtain the greatest degree of strength in the cover with the least possible weight of metal; and also in the combination of detachable weather-strips with the metallic frame of an illuminated vault-cover, to secure the glasses therein, permit their independent removal and replacement at pleasure, protect the joints from moisture, and prevent leakage thereat.

In the accompanying drawings, A represents elongated glass lights having their upper surfaces curved, as at $a$, and their lower faces angular, as at $b$, Figs. 2 and 3.

B is the metal frame, and $c c$ the inverted girders upon which the glasses are secured. Longitudinal recesses $d\ d'$ are formed on each side or upon the upper edges of said girders, along their entire length, and are continued in the frame itself at either end, to receive corresponding projections formed along the entire length of the sides and upon the ends of the glasses.

The upper faces of the girders are plain, but their lower sides present arcs of a circle, so that the greatest weight of metal in each girder is at its central point.

When the glasses A A are placed in position upon and between the girders of the frame a suitable cement may be placed between the glasses and the metal supports in the recesses wherein they are fitted, to render the joints air and water tight.

Weather-strips D, having their upper faces curved and lower faces flat, are secured, by screws or otherwise, upon the girders $c c$ after the glasses have been fitted in place, said strips having a width sufficient on their lower face to overlap and retain firmly the edges of the glasses and cover the joint made thereby with the recesses in the girders wherein they are set.

My improved vault-illuminators and platform lights, constructed as above described, of elongated glasses properly secured in a metallic frame, present many important advantages, from the fact, first, that the peculiar corrugated or ribbed upper surface obtained therein by the use of elongated glasses secured by corresponding weather-strips affords a safe and secure foot-hold for pedestrians, whereas the globular or other forms of glass heretofore used for paving purposes in this connection, where light is required to be reflected below the surface thereof, have been found in practice unsafe and insecure as a foot-hold, by reason of their form and position in the frame; second, a greater amount of light is obtained in a given area by the use of the elongated glasses than by any other forms of illuminators; third, any one of the glasses may be removed when fractured, and replaced with facility and without disturbing the remainder or removing the frame, by simply taking up the strip securing it in place; fourth, the glasses cannot work loose and become displaced when exposed to rough usage, because they are retained by strips; fifth, the frame may be constructed with greater economy of material, of less weight, at less cost, and with increased strength, because of the peculiar inverted form of the girders therein; sixth, vault-illuminators so constructed will not leak, as the longitudinal grooves formed by, between, and along the glasses and their retaining strips provide channels for carrying off readily and quickly all surplus moisture.

Having thus fully described my invention, what I claim therein as new, and desire to secure by Letters Patent, is—

1. The combination of inverted or centrallyenlarged girders c c with elongated glasses A A in the construction of a vault-cover, substantially in the manner and for the purpose herein described.

2. The arrangement and combination of retaining-strips over and upon the joints of the glasses and frame of an illuminated vault-cover, to secure said glasses and protect the joints from moisture, substantially in the manner herein set forth.

The foregoing specification of my improved corrugated glass and iron vault-illuminator and platform-light signed by me.

GEO. H. JOHNSON.

In presence of—
 DAVID A. BURR,
 H. H. YOUNG.